July 18, 1961

R. HAYDOCK 2,992,449

CASTER INSERT SOCKET

Filed Jan. 14, 1959

Inventor:
Raymond Haydock
By Horton, Davis,
Brewer & Brugman
Attys.

ns patented July 18, 1961

2,992,449
CASTER INSERT SOCKET
Raymond Haydock, 6711 Lightfoot Ave., Chicago 46, Ill., assignor to Raymond Haydock, Chicago, Ill., trustee
Filed Jan. 14, 1959, Ser. No. 786,713
8 Claims. (Cl. 16—43)

The present invention relates to casters and more particularly to an insert socket for casters.

The insert socket of the present invention is for the purpose of mounting a caster in a furniture leg, and a broad object of the invention is to provide an insert socket of the character noted that is of integral molded construction and which in the assembly of the furniture piece and caster constitutes the sole medium interposed between the pintle of the caster and the furniture leg for mounting the caster in place.

An important advantage of the insert socket is that due to the fact that it is the sole means between the pintle of the caster and the furniture leg, as mentioned, fewer parts are required for mounting and retaining the caster in the furniture leg than have heretofore been necessary, with the result that the insert socket, and consequently, the assembly of this insert socket and related parts, are less expensive both from the standpoint of manufacture, and assembly thereof.

A further advantage of the construction just referred to is that better swivelling action of the caster in the assembly is accomplished, with elimination or minimization of binding action of the caster.

Another object and advantage of the invention is that the insert socket is well adapted to forming a sub-assembly with a caster, and this sub-assembly can be shipped as such, and in such condition that it can be applied to the intended furniture leg as a sub-assembly, and merely by fitting it to the leg; this results in saving of time in various steps from the point of manufacture to the point of applying it to the furniture piece.

Another important object of the invention is to provide an insert socket of the general character referred to above that is of integral one piece construction of molded material such as a plastic material, that has novel double wall construction, the double wall construction providing various advantages including minimization of material used in its construction, and substantial resilience so as to accommodate a degree of misalignment between the caster and furniture leg in which it is mounted.

This double wall construction furthermore will accommodate distortion of the furniture leg such as by bending the wall of a metal furniture leg, without transmission of such distortion to the inner wall of the insert socket whereby any binding effect on the pintle of the caster from this possible source is avoided.

A still further advantage of the double wall construction is that an insert socket may readily be adapted to each of various sizes of furniture leg while accommodating the same size caster pintle, by varying the outer wall element while retaining the inner wall element of the same given dimensions, while utilizing a minimum of material for molding the socket for each of the different sizes thereof.

A still further object of the invention is to provide an insert socket of the character noted, that is held in the furniture leg in which it is used, solely by direct friction engagement with the furniture leg, and in which the caster pintle is held solely by direct friction engagement with the socket in an assembly of such furniture leg, caster, and insert socket.

Other objects and advantages of the invention will be apparent from the following detailed description taken in conjunction with the accompanying drawing in which.

Figure 5:
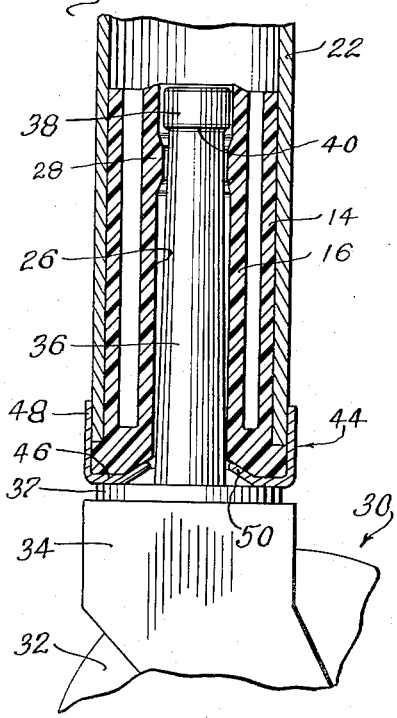
FIGURE 5 is an axial sectional view of an assembly including an insert socket, caster and furniture leg.

Referring in detail to the accompanying drawing, the insert socket for casters is shown in its entirety in FIGS. 1 to 4, and in assembly with a furniture leg and caster in FIG. 5. The insert socket, as shown in FIGS. 1 to 4, is indicated in its entirety at 12 and is in the form of an integral article molded to shape, including certain elements of structure described in detail hereinbelow. The material from which the insert socket is made is preferably a plastic material of known kind such as polyethylene, and as such, possesses a certain degree of resilience. The material itself has a degree of resilience, and additionally the socket, due to its special shape and construction, possesses a certain degree of resilience for purposes of accommodating slight misalignment between the caster and the furniture leg in which it is mounted. However, the insert socket is sufficiently rigid to maintain the desired alignment between the caster and furniture leg under normal conditions and in the absence of unusual forces.

The socket 12 includes an outer wall element 14 and an inner wall element 16, both preferably generally cylindrical in form, defining a generally tubular socket. The outer and inner wall elements are connected together by a series of circumferentially spaced radially and longitudinally extending fins 18, which in themselves are in the form of wall elements. These fins extend nearly the full axial length of the insert socket and establish interconnection between two wall elements throughout their length.

Figure 1:
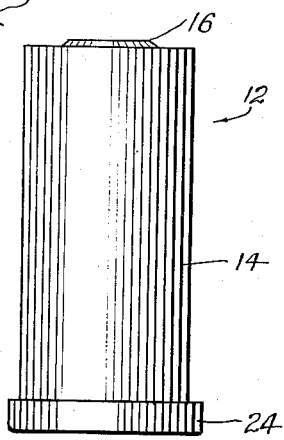
FIGURE 1 is an elevational view of the insert socket embodying the features of the present invention.
Figure 2:
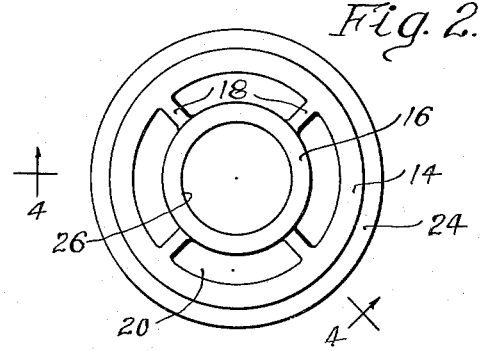
FIGURE 2 is a top end view of the socket, on an enlarged scale.
Figure 3:
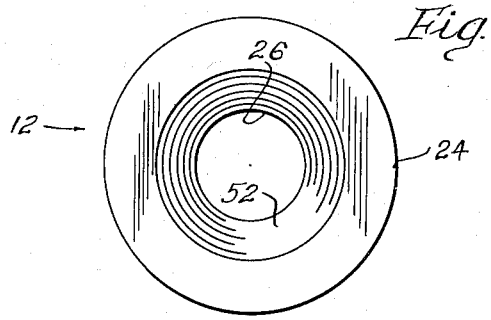
FIGURE 3 is a bottom end view of the socket, also on an enlarged scale.
Figure 4:
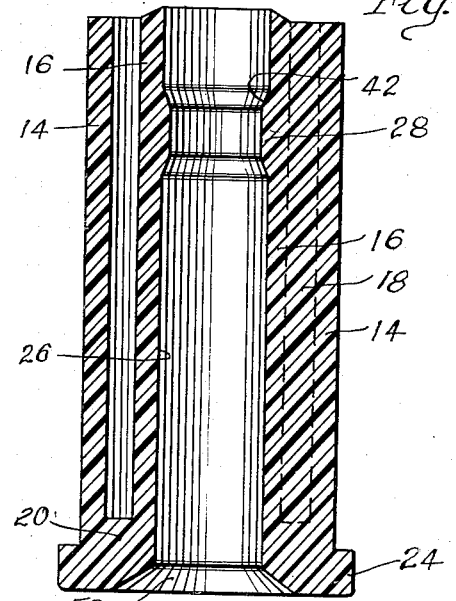
FIGURE 4 is an axial sectional view of the socket taken on line 4—4 of FIG. 2.

The insert socket for convenience may be described as oriented in FIGS. 1, 4, and 5, having an upper end and a lower end, being inserted in the furniture leg in such position. The socket at its lower end includes a relatively massive base portion 20 which interconnects the wall elements as well as the fins 18, this base element being circumferentially and radially continuous. The outer surface of the outer wall element 16 is preferably cylindrical in shape for frictional engagement with the inner surface of the furniture leg in which it is fitted. Such a furniture leg is shown at 22 in FIGURE 5 and as there shown, it is in the form of a uniformly cylindrical member such as a metal furniture leg. In fact, the insert socket of the present invention finds special adaptability to metal furniture legs. The insert socket is predimensioned in accordance with the dimension of a predetermined furniture leg so that the friction established between the outer wall element and the inner surface of the furniture leg is relatively high so as to frictionally retain the socket and caster in the furniture leg in the normal use thereof. However, the assembly may be removed by grasping the caster and pulling downwardly thereon.

The base portion 20 of the socket is provided with a radial flange 24 for engagement with the lower end surface of the furniture leg surrounding the recess formed by the interior of the leg. The flange 24 preferably has a diameter substantially equal to the outer diameter of the furniture leg so as to form a surface flush therewith. The flange 24 forms a stop means for limiting the extent of insertion of the socket into the furniture leg.

The inner wall element 16 defines a central hole 26, open at the bottom for insertion of the pintle of the caster and preferably open at the top. This central hole is generally cylindrical in shape, but adjacent to and spaced from its upper end it has an inwardly extending circumferential projection 28 defining a detent of lesser diameter than the main surface of the hole 26, serving to frictionally and releasingly retain the caster in place. A caster of the kind suitable for use in conjunction with the insert socket of the present invention is shown in its entirety at 30 and is a conventional and well-known kind. The caster includes a wheel 32, yoke 34 and a pintle 36 rising from the yoke. The caster may have a collar 37 surrounding the lower end of the pintle. The pintle 36 in the kind of caster here shown tapers upwardly and terminates in a head 38 of slightly greater diameter than the portion of the pintle immediately therebelow, thus forming a downwardly facing shoulder 40 engageable by the upwardly facing shoulder 42 formed by the projection 28. The diameter of the central hole 26 preferably is substantially equal to the diameter of the lower end of the pintle, or the portion of greatest diameter, so as to have substantially a snug fit to prevent undue play between the socket and pintle. The diameter of the constriction formed by the projection 28 is slightly less than the diameter of the head 38 so as to form an interference fit therebetween, enabling the head to be forced through the constriction when sufficient force is applied to the caster for that purpose, but operative for establishing the desired friction therebetween to normally retain the caster in the socket, whether the socket is in the furniture leg or out of the leg. Preferably, there is a certain degree of play between the upper end of the pintle and the socket, both between the head 38 and the surface of the hole 26 above the projection and between the portion of the pintle immediately below the head and the surface of the projection 28. This play, however, is quite small so as to avoid undue movement of the pintle. The spaces shown at these locations in FIG. 5 are exaggerated.

Preferably a cap member 44, of conventional construction, is used in the assembly of furniture leg, caster, and socket. This cap member is annular in form and surrounds the pintle at the lower end thereof, having a transverse flange 46 engaging the end surface of the base portion 20 and which may also rest upon the collar 37. The cap member also includes an axial flange 48 dimensioned to snugly fit the outer surface of the flange 24 on the socket to confine the latter against outward displacement. This flange 48 preferably has sufficient dimension to overlap the lower end portion of the furniture leg, and similarly, snugly and frictionally fit the furniture leg. This flange 48 additionally presents a trim appearance to the lower end of the furniture leg. If desired, the cap member 44 may be provided with a conical portion 50 inwardly of the flange 46, in accordance with the present manner of construction, and to accommodate such shape the lower end of the insert socket may be provided with a conical surface 52 complementary thereto in shape.

The dimensions of the insert socket of the invention are pre-selected not only in accordance with the dimensions of the intended furniture leg 32, as noted above, but also with the dimensions of the caster desired to be used. Such a caster, which may be of conventional construction, will have, for example, a pintle of predetermined diameter and predetermined length. The length of the socket is preselected so as to be substantially equal to the length of the pintle. In assembly of such members the head 38 of the pintle terminates substantially at the upper end of the socket, so as to provide maximum spacing of the points of engagement between the pintle and socket. However, the relation between the lengths of the socket and pintle is not critical, but the greater the length of the pintle and socket, or in other words the greater the spacing between the effective points of engagement between the pintle and socket, which are at the ends thereof, the greater will be the stability of the caster relative to the furniture leg. In addition to the inherent resilience of the plastic material mentioned above from which the socket is preferably made, there is additional resilience provided by the spacing between the wall elements 14 and 16. This resilience is provided by the capability of the inner wall element of flexing toward and away from the outer wall element, in the spaces between adjacent fins 18. Moreover, the fins 18 themselves are enabled to flex and in doing so enable the inner wall element 16 to move toward and away from the outer wall element. Hence, the desired resilience is provided for enabling the pintle of the caster to be displaced from its properly aligned position such as at an angle to the longitudinal axis of the socket. This misalignment may occur from rolling the piece of furniture in which the caster is incorporated on the floor, as well as from distortion of the furniture leg. The resilience provided by the insert socket will readily accommodate such displaced positions of the caster, so that the caster pintle may be maintained in perfectly vertical position, or perpendicular to the supporting floor.

The continuous base portion 20 provides relatively more solid spacing means between the caster pintle and the furniture leg to absorb the heavier shocks in movements of the piece of furniture across the floor. However, there is nevertheless a certain degree of resilience provided by this base portion, although less than that provided at the upper end of the socket. The socket provides the sole means between the pintle and furniture leg for retaining the caster in the furniture leg, it being understood that the cap member 44 does not partake of this action. The insert socket has friction engagement with the furniture leg and with the pintle, retaining the caster in place solely by friction. The insert socket is a unitary and integral piece, rendering it economical and inexpensive both from the standpoint of manufacturing costs and fitting it in the assembly with the furniture leg and caster.

The friction established between the insert socket and pintle is sufficient to normally maintain the caster in a sub-assembly with the socket, when out of the furniture leg, and this sub-assembly may be shipped and otherwise handled as such so that at the point of final use, it is applied to the furniture leg merely by inserting the insert socket, with the pintle therein, in the furniture leg. It is driven home to the intended limiting position as shown in FIG. 5. The cap member 44 is placed in position on the pintle before the insert socket is telescoped over the pintle. Great economies are realized by the fact that this sub-assembly need not be again dis-assembled before final use.

The thickness of the wall elements 14 and 16 and the fins 18 need not be precisely dimensioned, the primary consideration being sufficient strength and rigidity, while providing spaces between the wall elements of substantial dimension as to reduce to a minimum the total amount of material making up the socket and thus decreasing its cost. Another advantage of this construction is that a socket of basic design may be easily adapted to furniture legs of different diameters, merely by selecting the appropriate dimensions of the outer wall element while maintaining the inner wall element of the same dimensions.

The elimination of a mounting piece between the pintle and socket, such as a metal sleeve, is considered a substantial saving both from the standpoint of material used and time consumed in manufacturing and assembling the parts. There is substantially no impedance to angular displacing movements of the caster pintle except the yieldability of the socket.

If the furniture leg should become distorted, as for example, flattened, the relative yieldability between the outer antd inner wall elements of the socket accommodate such distortion so as to maintain perfect swivelling action of the caster, without any binding effect between the caster and socket therein.

It is thought that the invention and its attendant advantages will be understood from the foregoing description, and it will be apparent that various changes may be made in form, construction, and arrangement of the parts without departing from the spirit and scope of the invention or sacrificing all of its material advantages, the form hereinbefore described and illustrated in the drawing being merely a preferred embodiment thereof.

I claim:

1. An assembly for use with a caster of predetermined dimensions having a pintle generally tapered upwardly with an enlarged head at the upper end of the pintle, comprising, a furniture leg having a recess therein, an integral molded article of plastic material or the like having an outer wall element and an inner wall element both extending substantially the same length and a series of spaced radial and longitudinal fins interconnecting the inner surface of the outer wall element and the outer surface of the inner wall element, extending substantially the length of the wall elements and spaced therearound, the insert socket having a length similar to the length of the pintle and the inner wall element defining a central hole extending entirely through the socket for receiving the pintle, said central hole being generally cylindrical and of a diameter substantially equal to the diameter of the large lower end of the pintle and having an inwardly extending projection adjacent to but spaced from an upper end thereof disposed below the enlarged head of the pintle when the pintle is disposed in the socket and forming a shoulder for engagement by the head and for normally and frictionally retaining the pintle in the socket, the socket being adapted for insertion in said recess in the furniture leg and having a base portion radially and circumferentially continuous for receiving lateral thrust from the lower portion of the pintle, and the base portion having a radially projecting flange at the lower end of the socket for engagement with the furniture leg for limiting the insertion of a socket in the recess.

2. An insert socket of the character disclosed, comprising an integral molded article of resilient material, tubular in shape and of double wall construction and having an outer and an inner wall element both extending substantially the same length, a series of radial fins interconnecting the inner surface of the outer wall element and the outer surface of the inner wall element extending substantially the length of the wall elements and spaced therearound, the inner surface of the inner wall element defining a hole for receiving the pintle of a caster in engagement with that wall surface at any point throughout its circumference, the socket being adapted for insertion in a recess in a furniture leg in friction engagement between substantially the full outer surface of the outer wall element and the wall of the recess, and the socket having a portion at a lower end extending radially beyond the outer wall element forming stop means for engaging the furniture leg around the recess therein for limiting its insertion in the recess.

3. The invention set out in claim 2 in which the socket has a base portion at a lower end circumferentially and radially continuous.

4. The invention set out in claim 2 in which the material from which the socket is made is a molded plastic material of limited resilience, the fins extend radially and longitudinally substantially throughout the length of the wall elements, and are circumferentially spaced, and the double wall construction provides a limited amount of resilience due to flexing action of the fins and flexing action of the inner wall element between fins.

5. The invention set out in claim 4 in which the hole defined by the inner wall element is generally cylindrical in shape but the inner wall element has a radially inwardly extending projection on its inner surface for engagement by an enlarged head on a caster pintle inserted in the hole.

6. The combination of an insert socket according to claim 2 in assembly with a caster having a pintle with an enlarged head at its upper end inserted in the socket with the head positioned upwardly beyond said inwardly extending projection and frictionally held thereby, whereby the caster is frictionally held in the socket.

7. The combination set out in claim 6 in assembly with an annular cap fitted on and surrounding the pintle and having a transverse portion engaging the end surface of said base portion and an axial flange surrounding and confining said radial flange on the socket.

8. The combination set out in claim 7 in assembly with a furniture leg having a recess with the socket inserted therein and frictionally engaging the surrounding surface of the recess and thereby frictionally retaining the socket and caster in the recess, said radial flange on the socket engaging the lower surface of the furniture leg around the recess, and the axial flange on said cap extending axially beyond said radial flange on the socket and surrounding and engaging the lower end portion of the furniture leg.

References Cited in the file of this patent

UNITED STATES PATENTS

| 959,108 | Bent | May 24, 1910 |
| 1,424,028 | Noelting | July 25, 1922 |
| 1,929,743 | Jarvis et al. | Oct. 10, 1933 |
| 2,546,492 | Booth | Mar. 27, 1951 |
| 2,644,978 | Becker | July 14, 1953 |

FOREIGN PATENTS

| 485,622 | Canada | Aug. 12, 1952 |